（12) United States Patent
Kos et al.

(10) Patent No.: US 11,789,551 B2
(45) Date of Patent: Oct. 17, 2023

(54) DYNAMICALLY PROVIDING PERCEPTIBLE FEEDBACK FOR A ROTARY CONTROL COMPONENT

(71) Applicant: Microsoft Technology Licensing, LLC, Redmond, WA (US)

(72) Inventors: Paul Kos, Shenzhen (CN); Masaaki Fukumoto, Beijing (CN); Siyuan Ma, Bothell, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/631,579

(22) PCT Filed: Sep. 10, 2019

(86) PCT No.: PCT/CN2019/105050
§ 371 (c)(1),
(2) Date: Jan. 31, 2022

(87) PCT Pub. No.: WO2021/046702
PCT Pub. Date: Mar. 18, 2021

(65) Prior Publication Data
US 2022/0276726 A1 Sep. 1, 2022

(51) Int. Cl.
*G06F 3/0362* (2013.01)
*G06F 3/01* (2006.01)
(Continued)

(52) U.S. Cl.
CPC ............ *G06F 3/0362* (2013.01); *G06F 3/016* (2013.01); *G06F 3/04847* (2013.01); *G06F 8/65* (2013.01)

(58) Field of Classification Search
None
See application file for complete search history.

(56) References Cited

U.S. PATENT DOCUMENTS 6,636,197 B1  10/2003  Goldenberg et al.
7,155,305 B2  12/2006  Hayes et al.
(Continued)

FOREIGN PATENT DOCUMENTS

CN  104053083 A  9/2014
EP   2264562 A2  12/2010

OTHER PUBLICATIONS

"International Search Report and Written Opinion Issued in PCT Application No. PCT/CN19/105050", dated May 29, 2020, 10 Pages.
(Continued)

*Primary Examiner* — Amare Mengistu
*Assistant Examiner* — Sarvesh J Nadkarni
(74) *Attorney, Agent, or Firm* — Schwegman Lundberg & Woessner, P.A.

(57) ABSTRACT

A method, an apparatus and a corresponding electronic device for dynamically providing perceptible feedback for a rotary control component of an electronic device are provided. An operation on the rotary control component is detected. An initial value of the rotary control component is synchronized with a software control value of the electronic device. A variation value corresponding to the operation is identified. It is determined that the initial value and the variation value meet a feedback condition. Perceptible feedback is provided through a feedback component of the electronic device.

14 Claims, 13 Drawing Sheets

(51) Int. Cl.
　　*G06F 3/04847*　　　(2022.01)
　　*G06F 8/65*　　　　　(2018.01)

(56) References Cited

U.S. PATENT DOCUMENTS

| | | | |
|---|---|---|---|
| 9,124,442 | B2 | 9/2015 | Mccormack |
| 9,251,702 | B2 | 2/2016 | Geeraerts |
| 2004/0257339 | A1 | 12/2004 | Takahashi |
| 2005/0156892 | A1 | 7/2005 | Grant |
| 2006/0095846 | A1* | 5/2006 | Nurmi ............... G06F 3/016 715/810 |
| 2010/0005412 | A1 | 1/2010 | Tauchi et al. |
| 2012/0249315 | A1 | 10/2012 | Vanhelle et al. |
| 2013/0198625 | A1 | 8/2013 | Anderson et al. |
| 2016/0216781 | A1 | 7/2016 | Robbins |
| 2017/0353168 | A1 | 12/2017 | Snyder et al. |
| 2018/0298959 | A1 | 10/2018 | Battlogg |
| 2020/0081538 | A1* | 3/2020 | Moussette ............ G06F 3/0362 |

OTHER PUBLICATIONS

Bridge, et al., "Surface Dial Interactions", Retrieved From: https://docs.microsoft.com/en-us/windows/apps/design/input/windows-wheel-interactions, Dec. 15, 2021, 25 Pages.

MacLean, et al., "An Architecture for Haptic Control of Media", In the Proceedings of the ASME Dynamic Systems and Control Division: International Mechanical Engineering Congress and Exposition Eighth Annual Symposium on Haptic Interfaces for Virtual Environments and Teleoperator Systems, Nov. 14, 1999, 10 Pages.

Sinclair, et al., "TouchMover: Actuated 3D Touchscreen with Haptic Feedback", In Proceedings of the ACM International Conference on Interactive Tabletops and Surfaces, Oct. 6, 2013, pp. 287-296.

"Extended Search Report Issued in European Patent Application No. 19945322.6", dated Mar. 30, 2023, 9 Pages.

"Office Action Issued in Chinese Patent Application No. 201980072836.3", dated Jul. 28, 2023, 15 pages.

* cited by examiner

DYNAMICALLY PROVIDING PERCEPTIBLE FEEDBACK FOR A ROTARY CONTROL COMPONENT

CROSS-REFERENCE TO RELATED APPLICATIONS

This application is a U.S. National Stage Filing under 35 U.S.C. 371 of International Patent Application Serial No. PCT/CN19/105050, filed Sep. 10, 2019, which application is incorporated herein by reference in their entirety.

BACKGROUND

Rotary control components are adopted in some electronic devices. Herein, a "rotary control component" may refer to a mechanical component in an electronic device, which is rotatable for controlling or adjusting operating state of the electronic device, e.g., volume, temperature, light strength, indicated position, etc. The rotary control component may be in a form of dial or wheel. For example, the electronic device may be headphone, thermostat, stereo system, speaker, dimmer, mouse, etc. The rotary control component may be a dial on a headphone for controlling volume, a dial in a thermostat for controlling temperature, a dial in a dimmer for controlling light strength, a wheel in a mouse for controlling position indicated by a cursor in a screen, etc.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose method and apparatus for dynamically providing perceptible feedback for a rotary control component of an electronic device, and further propose a corresponding electronic device. An operation on the rotary control component may be detected. An initial value of the rotary control component may be synchronized with a software control value of the electronic device. A variation value corresponding to the operation may be identified. It may be determined that the initial value and the variation value meet a feedback condition. Perceptible feedback may be provided through a feedback component of the electronic device.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

Figure 1:
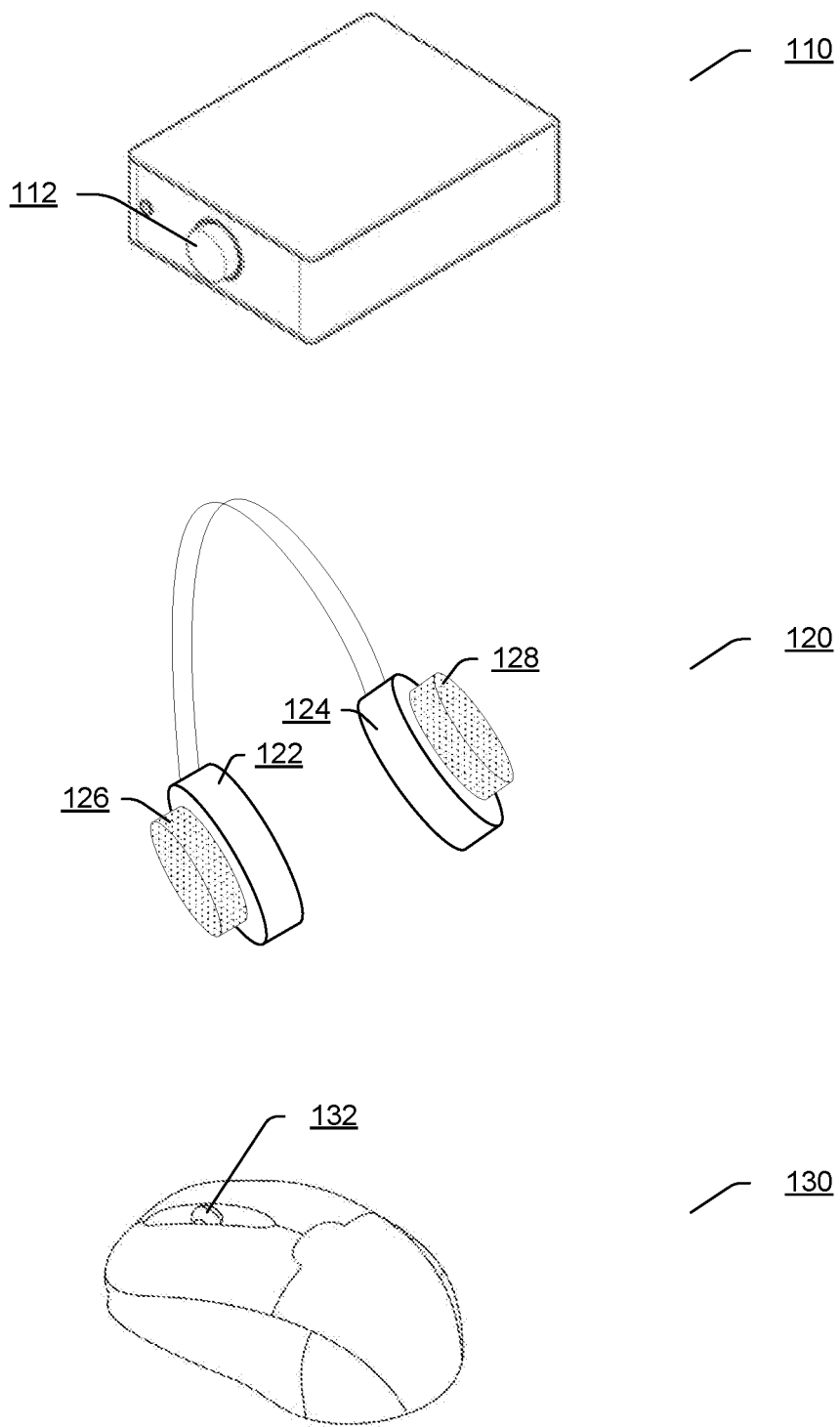
FIG. 1 illustrates exemplary electronic devices containing rotary control components.

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Operating state of an electronic device may be controlled via multiple approaches. In an approach, a mechanical component in the electronic device may be used for controlling the operating state. For example, a rotary control component in the electronic device may be rotated for providing a mechanical control value associated with the operating state. In another approach, a software control module associated with the electronic device may be used for controlling the operating state. For example, the software control module may provide a user interface through which a user can set a software control value corresponding to the operating state. The user interface may include, e.g., a scroll bar, a simulated knob, a digit input box, etc., through which the user can set the software control value. In some cases, the software control module may be implemented in the electronic device, and may cooperate with relevant components in the electronic device, e.g., screen, input component, etc. In other cases, the software control module may be implemented in a control device other than the electronic device, e.g., cellphone, personal computer, remote controller, etc. The control device can communicate with the electronic device through various types of communication channel, to send the software control value to the electronic device. The communication channel may be established based on a wired or wireless connection.

Some traditional rotary control components may have hard-stop units, and can provide a mechanical control value corresponding to a level of the operating state of the electronic device. The hard-stop units are usually placed at limit value positions of a rotary control component, such that when the rotary control component is rotated in a certain direction to a limit value position, the rotary control component would be mechanically stopped and no further rotation operation can be done on the rotary control component in this direction. The limit value positions may comprise, e.g., the maximum value position and the minimum value position settable by the rotary control component. This type of rotary control component with hard-stop units cannot be effectively synchronized with a software control module. For example, it is difficult to synchronize a mechanical control value set by the rotary control component with a software control value set by the software control module.

In some other traditional rotary control components, hard-stop units are removed. This type of rotary control component without hard-stop unit can provide a mechanical control value indicating an incremental or decremental amount of a level of the operating state of the electronic device. There is no need to synchronize this type of rotary control component with the software control module. However, when rotating this type of rotary control component, since the user cannot feel or recognize any limit value position that could have been indicated by hard-stop units, the user may over-rotate the rotary control component even though the level of the operating state has exceeded limit values.

Embodiments of the present disclosure propose to dynamically provide perceptible feedback for a rotary control component of an electronic device. The rotary control component may be effectively synchronized with a software control module associated with the electronic device. For example, synchronization may be performed between a mechanical control value by the rotary control component and a software control value by the software control module. Once synchronized, certain value positions, e.g., limit value positions or any other value positions, or certain value ranges defined by individual value positions may be further dynamically determined. When a feedback condition is met, e.g., when it is determined that the rotary control component is rotated to a dynamically-determined certain value position or certain value range, corresponding perceptible feedback may be provided to the user, such that the user may recognize that the rotary control component has been rotated to the certain value position or certain value range. Through dynamically determining whether a feedback condition is met and providing perceptible feedback accordingly, the user's experience may be significantly improved. Herein, "perceptible feedback" may refer to any types of feedback that can be felt or recognized by users, comprising, e.g., tangible feedback, sound feedback, visual feedback, etc. The perceptible feedback may be provided by a feedback component in the electronic device.

FIG. 1 illustrates exemplary electronic devices containing rotary control components.

The electronic device 110 may be, e.g., a thermostat, a dimmer, a part of a stereo system, etc. The electronic device 110 comprises a dial 112 used as a rotary control component. The dial 112 may be used for controlling operating state of the electronic device 110. For example, in the case that the electronic device 110 is a thermostat, the dial 112 may be rotated to control operating temperature of the thermostat.

The electronic device 120 is a headphone. The headphone comprises two speakers 122 and 124, and two dials 126 and 128 installed on the two speakers respectively. The dials 126 and 128 are used as rotary control components for controlling operating state of the headphone. For example, the dial 126 may be rotated to control volume of the headphone, and the dial 128 may be rotated to change sound modes of the headphone.

The electronic device 130 is a mouse. The mouse 130 comprises a wheel 132 used as a rotary control component. The wheel 132 may be used for controlling a position indicated by the mouse. For example, the wheel 132 may be rolled or rotated to change a position of a cursor in a screen.

It should be appreciated that FIG. 1 only shows several exemplary electronic devices containing rotary control components, and the electronic devices involved in the present disclosure may also cover any other types of electronic devices containing rotary control components.

Figure 2:
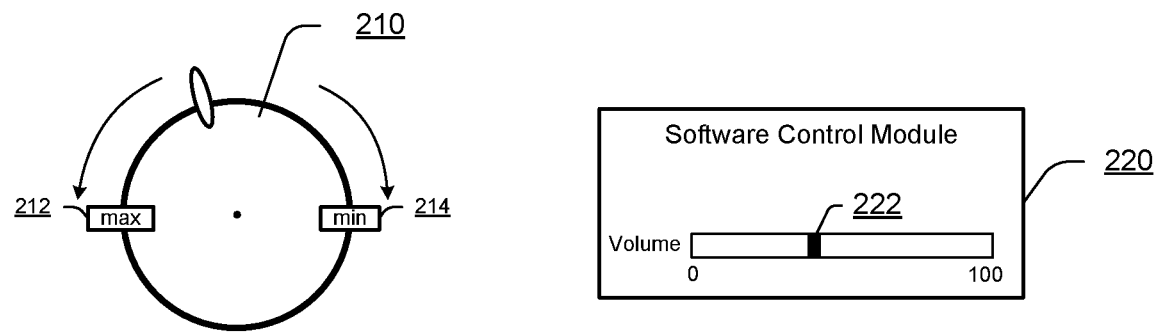
FIG. 2 illustrates an exemplary existing rotary control component with hard-stop units in an electronic device.

FIG. 2 illustrates an exemplary existing rotary control component with hard-stop units in an electronic device.

It is assumed that the electronic device is a speaker. The speaker comprises a rotary control component 210 which may be a dial. The rotary control component 210 is rotatable to control volume level of the speaker. The speaker further comprises two hard-stop units 212 and 214. The hard-stop unit 212 is fixedly placed at a position of the maximum volume and the hard-stop unit 214 is fixedly placed at a position of the minimum volume. When the rotary control component 210 is rotated to either of the hard-stop units 212 and 214, the rotary control component 210 would be stopped.

Moreover, FIG. 2 further illustrates a software control module 220 associated with the speaker. A user may slide a scroll bar 222 in a user interface provided by the software control module 220, to change volume level between the maximum volume "100" and the minimum volume "0". As discussed above, if the user sets the volume level to a new value through the scroll bar 222, this new value set through the software control module 220 cannot be effectively synchronized to the rotary control component 210.

Figure 3:
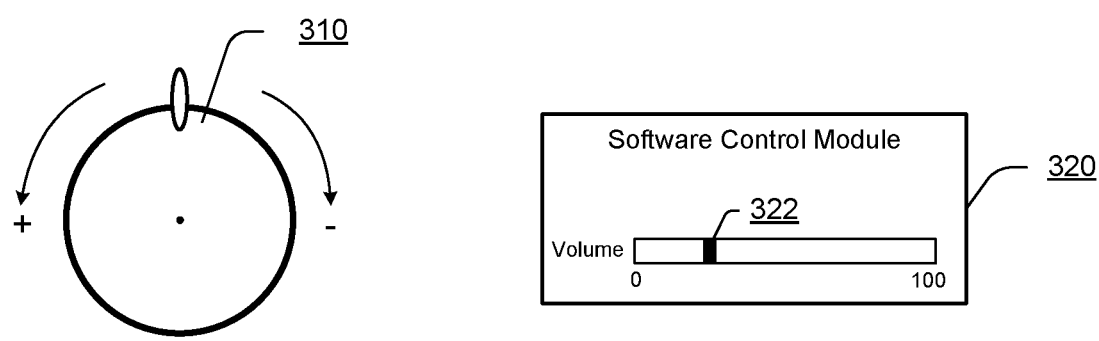
FIG. 3 illustrates an exemplary existing rotary control component without hard-stop unit in an electronic device.

FIG. 3 illustrates an exemplary existing rotary control component without hard-stop unit in an electronic device.

It is assumed that the electronic device is a speaker. The speaker comprises a rotary control component 310 which may be a dial. The rotary control component 310 is rotatable to control an incremental or decremental amount of volume level of the speaker. For example, if the rotary control component 310 is rotated counter clockwise, the volume would be turned up, while if the rotary control component 320 is rotated clockwise, the volume would be turned down. The change of volume level is proportional to the rotation distance of the rotary control component 310. As shown in FIG. 3, the rotary control component 310 does not comprise any hard-stop unit. Accordingly, the rotary control component 310 can keep rotated without being forced to stop.

Moreover, FIG. 3 further illustrates a software control module 320 associated with the speaker. Similar with the software control module 220 in FIG. 2, there is a scroll bar 322 in a user interface of the software control module 320, for changing volume level. As discussed above, since no hard-stop unit is set for the rotary control component 310, even though the volume level in the software control module has reached the maximum value "100", the user may be not aware of this and may continue the rotating of the rotary control component 310 counter-clockwise, or even though the volume level in the software control module has reached the minimum value "0", the user may still continue the rotating of the rotary control component 310 clockwise.

Figure 4:
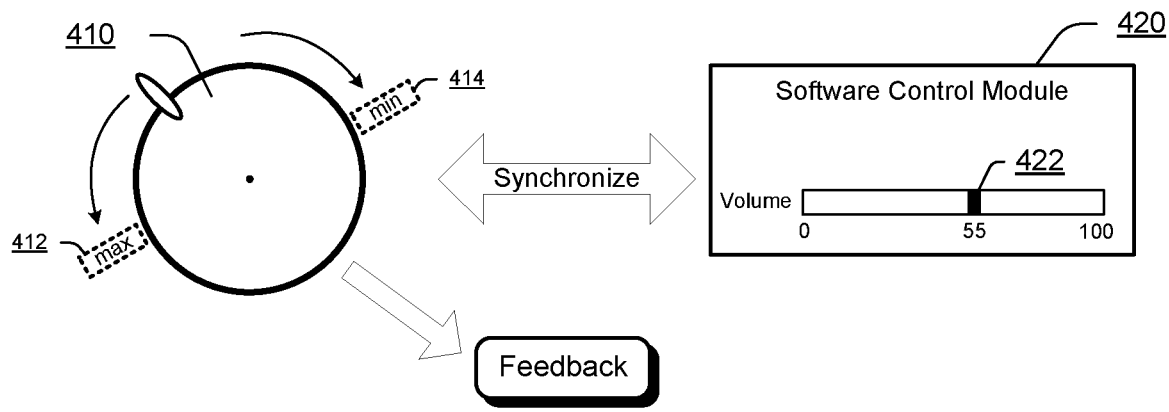
FIG. 4 illustrates an exemplary rotary control component with dynamical limit value positions according to an embodiment.

FIG. 4 illustrates an exemplary rotary control component with dynamical limit value positions according to an embodiment.

It is assumed that an electronic device, e.g., a speaker, can be controlled by both a rotary control component 410 and a software control module 420. The speaker does not assign any fixed limit value positions for the rotary control component 410. Instead, through synchronizing the rotary control component 410 with the software control module 420, dynamical limit value positions 412 and 414 may be determined. When detecting a rotation operation occurred on the rotary control component 410, an initial value of the rotary control component 410 prior to the rotation operation may be synchronized with a software control value of the electronic device set through the software control module 420. For example, if the current software control value is "55" as indicated by a scroll bar 422 in the software control module 420, the initial value of the rotary control component 410 may also be set as "55". Based on this initial value, the limit value positions, e.g., maximum volume position 412 and minimum volume position 414, may be further determined. Since the initial value may be changed over time, the limit value positions 412 and 414 would be determined dynamically.

In order to enable the user to feel or recognize that the rotary control component 410 has been rotated to a limit value position, perceptible feedback may be provided if the rotation operation causes the rotary control component to meet one or more feedback conditions, e.g., reach or exceed a dynamical limit value position.

It should be appreciated that the example in FIG. 4 may be altered or improved in any ways. For example, in addition to the limit value positions 412 and 414, any other interested value positions may be determined dynamically. Accordingly, when the rotary control component 410 is rotated to an interested value position, perceptible feedback may be provided. Moreover, for example, instead of triggering perceptible feedback in response to determining that the rotary control component 410 is rotated to a certain value position, perceptible feedback may also be triggered through determining that a current value of the rotary control component 410 after the rotation operation is within a certain value range. Positions of the value range may be determined dynamically upon the initial value of the rotary control component 410 has been synchronized with the software control value. Moreover, for example, if there are two or more interested value positions or value ranges for which perceptible feedback are to provide, the perceptible feedback may be provided in respective levels for these interested value positions or value ranges.

Figure 5:
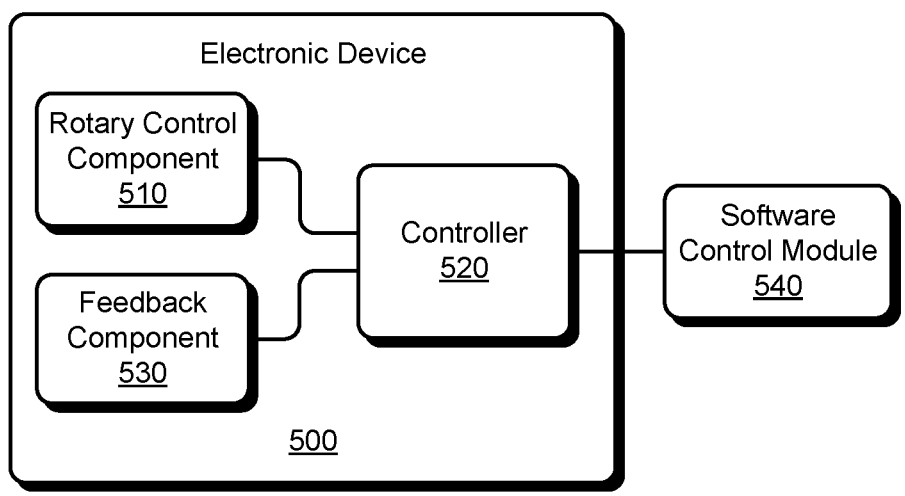
FIG. 5 illustrates an exemplary electronic device capable of dynamically providing perceptible feedback according to an embodiment.

FIG. 5 illustrates an exemplary electronic device 500 capable of dynamically providing perceptible feedback according to an embodiment.

The electronic device 500 may comprise a rotary control component 510 being rotatable to cause a change of operating state of the electronic device 500, a controller 520, a feedback component 530 for providing perceptible feedback, etc. The electronic device 500 is associated with a software control module 540 which is also configured for controlling the operating state of the electronic device 500. The software control module 540 may be implemented in a control device other than the electronic device 500, and capable of communicating with the controller 520. Alternatively, although not shown, the software control module 540 may also be implemented in the electronic device 500 and thus is a part of the electronic device 500.

The controller 520 may be any types of processing unit configured for implementing the process of dynamically providing perceptible feedback according to the embodiments of the present disclosure. It is shown in FIG. 5 that the controller 520 is included in the electronic device 520 as a local component. Alternatively, at least a part of processing functions of the controller 520 may be remotely implemented at a server, in the cloud, etc.

The controller 520 may detect an operation on the rotary control component 510. For example, the controller 520 may detect in real time whether the rotary control component 510 is rotated. In response to a detected operation on the rotary control component 510, the controller 520 may synchronize an initial value of the rotary control component 510 with a software control value of the electronic device 500 currently set by the software control module 540. The controller 520 may identify a variation value corresponding to the detected operation, e.g., rotation amount of the rotary control component 510 caused by the operation. If the operation causes the level of operating state to increase, the variation value would be a positive value, while if the operation causes the level of operating state to decrease, the variation value would be a negative value. The controller 520 may then determine whether the initial value and the variation value meet a feedback condition. If a feedback condition is met, the controller 520 may instruct the feedback component 530 to provide perceptible feedback.

The feedback component 530 may provide perceptible feedback on the electronic device 500 under the control of the controller 520. The perceptible feedback may be provided to users through the rotary control component 510 or other components in the electronic device 500. Various types of feedback mechanism may be adopted by the feedback component 530.

In an implementation, the feedback component 530 may comprise haptic feedback mechanism. The haptic feedback mechanism may provide perceptible feedback through generating, e.g., vibrations, etc. For example, the haptic feedback mechanism may be implemented through a linear resonant actuator (LRA), a piezo actuator, an eccentric rotating mass (ERM) actuator, etc. It should be appreciated that the haptic feedback mechanism according to the embodiments of the present disclosure is not limited to any specific implementation approaches, and can be implemented through the above exemplary implementation approaches or any other implementation approaches.

In an implementation, the feedback component 530 may comprise detent feedback mechanism. The detent feedback mechanism may provide perceptible feedback through mechanically applying damping to the rotation of the rotary control component 510. The detent feedback mechanism may be implemented through a moving detent changer. The moving detent changer may be moved to contact with or get close to the rotary control component 510 to apply or increase damping, and may be moved away from the rotary control component 510 to remove or decrease damping. The damping applied by the moving detent changer may be constant or variable. As an example, the moving detent changer may comprise at least one magnet unit, and when the moving detent changer is moved forward to the rotary control component 510, the magnet unit can apply damping to the rotation of the rotary control component 510 through magnet force. As another example, the moving detent changer may comprise a wedgy unit, and when the moving detent changer is moved forward to the rotary control component 510, the wedgy unit can contact notches or ratchets formed in the rotary control component 510 to apply damping to the rotation of the rotary control component 510. It should be appreciated that the detent feedback mechanism according to the embodiments of the present disclosure is not limited to any specific implementation approaches, and can be implemented through the above exemplary implementation approaches or any other implementation approaches.

In an implementation, the feedback component 530 may comprise brake feedback mechanism. The brake feedback mechanism may provide perceptible feedback through applying brake force to the rotation of the rotary control component 510, wherein the brake force is generated by physical property changes of material in the feedback component 530. As an example, the brake feedback mechanism may be implemented through magneto rheological (MR) fluid brake. MR fluid may change from a liquid state to a semi-solid state when an external magnetic field is applied, and accordingly may be used for generating brake force. As another example, the brake feedback mechanism may be implemented through electro rheological (ER) fluid brake. When an electric field is applied, ER fluid may change from a free-flowing liquid state to a state with finite static yield stress, similar with solid or gel, and accordingly may be used for generating brake force. As a further example, the brake feedback mechanism may be implemented through polymer brake. An electroactive polymer may change its shape or size when current is applied, and accordingly may be used for generating brake force. It should be appreciated that the brake feedback mechanism according to the embodiments of the present disclosure is not limited to any specific implementation approaches, and can be implemented through the above exemplary implementation approaches or any other implementation approaches.

In an implementation, the feedback component 530 may comprise sound feedback mechanism. The sound feedback mechanism may provide perceptible feedback through playing sound to users. The sound feedback mechanism may be implemented through a sound player. For example, the sound player may play a pre-stored sound directly through a speaker. Alternatively, the sound player may generate a sound signal through an acoustic generator and further play the generated sound signal through a speaker. It should be appreciated that the sound feedback mechanism according to the embodiments of the present disclosure is not limited to any specific implementation approaches, and can be implemented through the above exemplary implementation approaches or any other implementation approaches.

In an implementation, the feedback component 530 may comprise visual feedback mechanism. The visual feedback mechanism may provide perceptible feedback through displaying visual indications to users. The visual feedback mechanism may be implemented through a visual indication displaying unit. For example, the visual indication displaying unit may be an indication lamp which may be lighted up or flashed, a screen which may present predetermined image or text, etc. It should be appreciated that the visual feedback mechanism according to the embodiments of the present disclosure is not limited to any specific implementation approaches, and can be implemented through the above exemplary implementation approaches or any other implementation approaches.

The feedback component 530 may adopt any combination of the feedback mechanisms discussed above. Moreover, the feedback component 530 is not limited to any particular feedback mechanism, but can adopt any feedback mechanism capable of enabling a user to feel or recognize the current operating state of the electronic device 500.

Figure 6:
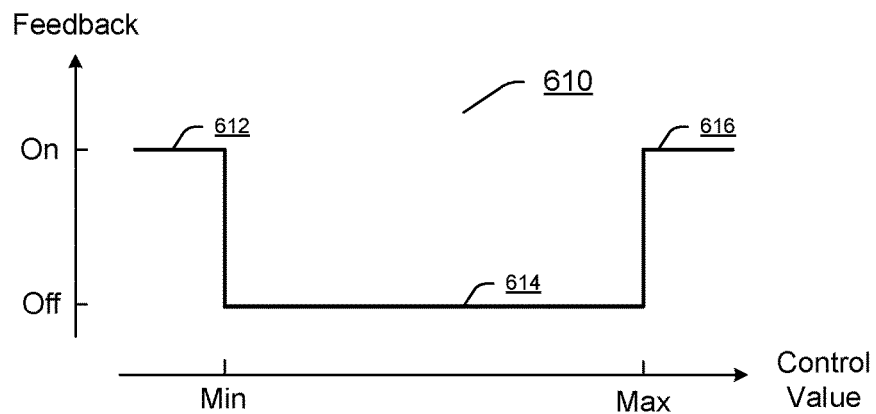
FIG. 6 illustrates exemplary feedback enforcing strategies according to some embodiments.
Figure 6:
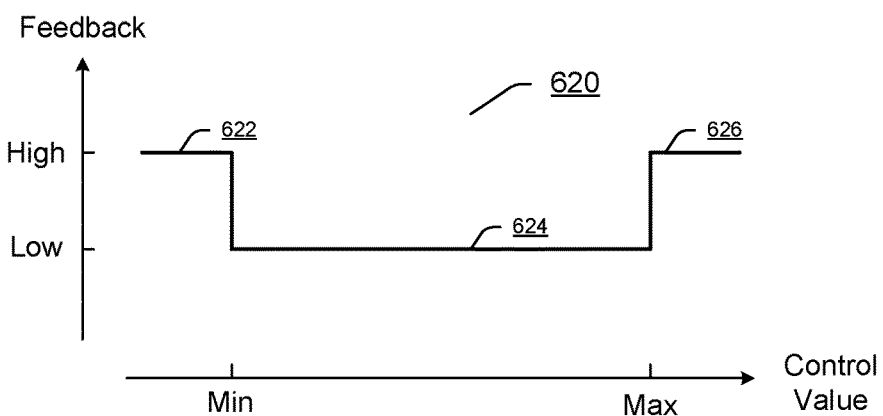
Figure 6:
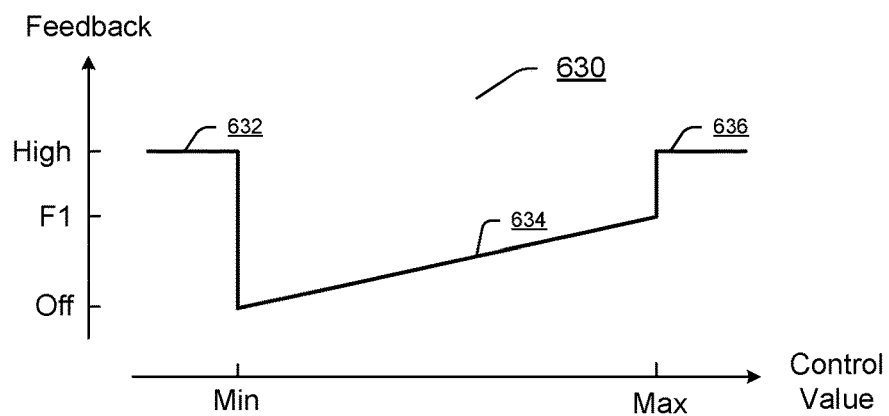

FIG. 6 illustrates exemplary feedback enforcing strategies according to some embodiments. Herein, a feedback enforcing strategy may define feedback conditions and respective feedback levels corresponding to the feedback conditions. The exemplary feedback enforcing strategies in FIG. 6 are illustrated as line graphs, wherein the x axis indicates control values by a rotary control component, and the y axis indicates feedback levels provided by a feedback component. It should be appreciated that the feedback enforcing strategies may also be presented in any forms other than line graphs.

A feedback enforcing strategy 610 is presented by line segments 612, 614 and 616. The line segment 612 indicates that: in the case that a control value of the rotary control component is already at the minimum value, if a rotation operation is performed to further decrease the control value, a feedback may be provided. That is, the line segment 612 corresponds to a feedback condition that an initial value of the rotary control component is the minimum value and a variation value caused by the rotation operation is below zero. The line segment 616 indicates that: in the case that a control value of the rotary control component is already at the maximum value, if a rotation operation is performed to further increase the control value, a feedback may be provided. That is, the line segment 616 corresponds to a feedback condition that an initial value of the rotary control component is the maximum value and a variation value caused by the rotation operation is above zero. The line segment 614 indicates that if the rotation operation causes the current value of the rotary control component to fall between the maximum value and the minimum value, no feedback would be provided. The current value may be calculated based on the initial value and the variation value, e.g., by adding up the initial value and the variation value.

A feedback enforcing strategy 620 is presented by line segments 622, 624 and 626. The line segment 622 indicates that: in the case that a control value of the rotary control component is already at the minimum value, if a rotation operation is performed to further decrease the control value, a feedback in a high level may be provided. That is, the line segment 622 corresponds to a feedback condition that an initial value of the rotary control component is the minimum value and a variation value caused by the rotation operation is below zero. The line segment 626 indicates that: in the case that a control value of the rotary control component is already at the maximum value, if a rotation operation is performed to further increase the control value, a feedback in the high level may be provided. That is, the line segment 626 corresponds to a feedback condition that an initial value of the rotary control component is the maximum value and a variation value caused by the rotation operation is above zero. The line segment 624 indicates that if the rotation operation causes the current value of the rotary control component to fall between the maximum value and the minimum value, a feedback in a low level would be provided. That is, the line segment 624 corresponds to a feedback condition that the current value of the rotary control component is between the maximum value and the minimum value.

A feedback enforcing strategy 630 is presented by line segments 632, 634 and 636. The line segment 632 indicates that: in the case that a control value of the rotary control component is already at the minimum value, if a rotation operation is performed to further decrease the control value, a feedback in a high level may be provided. That is, the line segment 632 corresponds to a feedback condition that an initial value of the rotary control component is the minimum value and a variation value caused by the rotation operation is below zero. The line segment 636 indicates that: in the case that a control value of the rotary control component is already at the maximum value, if a rotation operation is performed to further increase the control value, a feedback in the high level may be provided. That is, the line segment 636 corresponds to a feedback condition that an initial value of the rotary control component is the maximum value and a variation value caused by the rotation operation is above zero. The line segment 634 indicates that if the rotation operation causes the current value of the rotary control component to fall between the maximum value and the minimum value, a feedback would be provided. That is, the line segment 634 corresponds to a feedback condition that the current value of the rotary control component is between the maximum value and the minimum value. In this case, the level of the provided feedback may be proportional to the current value, e.g., linearly increasing from level 0 to level F1, wherein F1 is less than or equal to the maximum value. Moreover, depending on specific implementations of the feedback component, the level of the provided feedback may have analog values.

Figure 7:
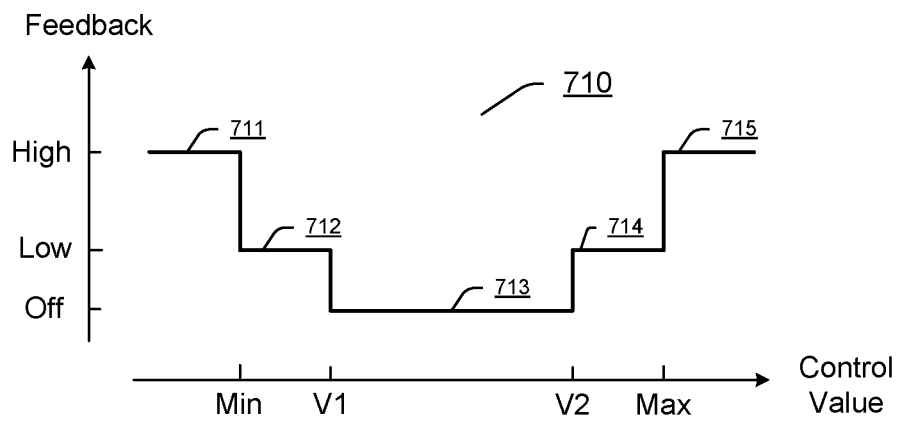
FIG. 7 illustrates exemplary feedback enforcing strategies according to some embodiments.
Figure 7:
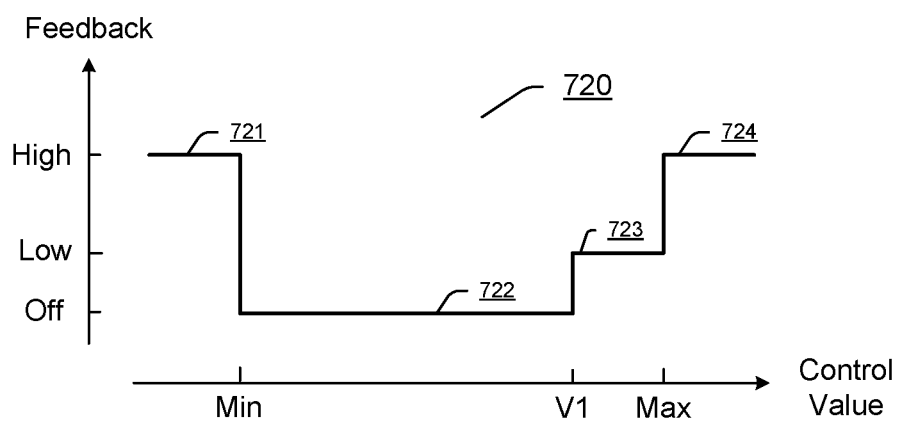

The exemplary feedback enforcing strategies in FIG. 6 involve two interested value positions of the rotary control component, e.g., the maximum value position and the minimum value position. However, it should be appreciated that more interested value positions may also be considered in some feedback enforcing strategies, as shown in FIG. 7. Accordingly, besides recognizing whether the rotary control component has exceeded limit value positions, the user may also recognize whether the rotary control component is rotated to other interested value positions or within value ranges associated with said other interested value positions.

FIG. 7 illustrates exemplary feedback enforcing strategies according to some embodiments.

A feedback enforcing strategy 710 is presented by line segments 711, 712, 713, 714 and 715. It can be seen that, besides the interested limit value positions, e.g., the minimum value position and the maximum value position, the feedback enforcing strategy 710 also considers two interested value positions V1 and V2. V1 and V2 may be of any values between the minimum value and the maximum value, e.g., V1 may be a value at the 10% position of the whole value range settable by the rotary control component, and V2 may be a value at the 90% position of the whole value range. The above four interested value positions form the following value ranges: a value range not higher than the minimum value, a value range between the minimum value and V1, a value range between V1 and V2, a value range between V2 and the maximum value, and a value range not lower than the maximum value. Feedback levels for different value ranges may be the same or different.

The line segment 711 indicates that: in the case that a control value of the rotary control component is already at the minimum value, if a rotation operation is performed to further decrease the control value, a feedback in a high level may be provided. That is, the line segment 711 corresponds to a feedback condition that an initial value of the rotary control component is the minimum value and a variation value caused by the rotation operation is below zero, or corresponds to a feedback condition that the current value of the rotary control component is within the value range not higher than the minimum value. The line segment 712 indicates that: if a rotation operation causes a current value of the rotary control component to fall within the value range between the minimum value and V1, a feedback in a low level may be provided. That is, the line segment 712 corresponds to a feedback condition that the current value of the rotary control component is within the value range between the minimum value and V1. The line segment 713 indicates that: if a rotation operation causes a current value of the rotary control component to fall within the value range between V1 and V2, no feedback would be provided. The line segment 714 indicates that: if a rotation operation causes a current value of the rotary control component to fall within the value range between V2 and the maximum value, a feedback in a low level may be provided. That is, the line segment 714 corresponds to a feedback condition that the current value of the rotary control component is within the value range between V2 and the maximum value. The line segment 715 indicates that: in the case that a control value of the rotary control component is already at the maximum value, if a rotation operation is performed to further increase the control value, a feedback in a high level may be provided. That is, the line segment 715 corresponds to a feedback condition that an initial value of the rotary control component is the maximum value and a variation value caused by the rotation operation is above zero, or corresponds to a feedback condition that the current value of the rotary control component is within the value range not lower than the maximum value.

A feedback enforcing strategy 720 is presented by line segments 721, 722, 723 and 724. Three interested value positions are considered, including the minimum value position, the maximum value position and a value position V1. V1 may be of any value between the minimum value and the maximum value. The above three interested value positions form the following value ranges: a value range not higher than the minimum value, a value range between the minimum value and V1, a value range between V1 and the maximum value, and a value range not lower than the maximum value. As shown by 720, feedback provided for the value range not higher than the minimum value and feedback provided for the value range not lower than the maximum value may be in a high level, feedback provided for the value range between V1 and the maximum value may be in a low level, while no feedback is provided for the value range between the minimum value and V1.

It should be appreciated that all the feedback enforcing strategies in FIG. 6 and FIG. 7 are exemplary. Any additions, deletions, replacements or combinations to these strategies that are made for actual application scenarios and requirements should also be covered by the present disclosure.

Figure 8:
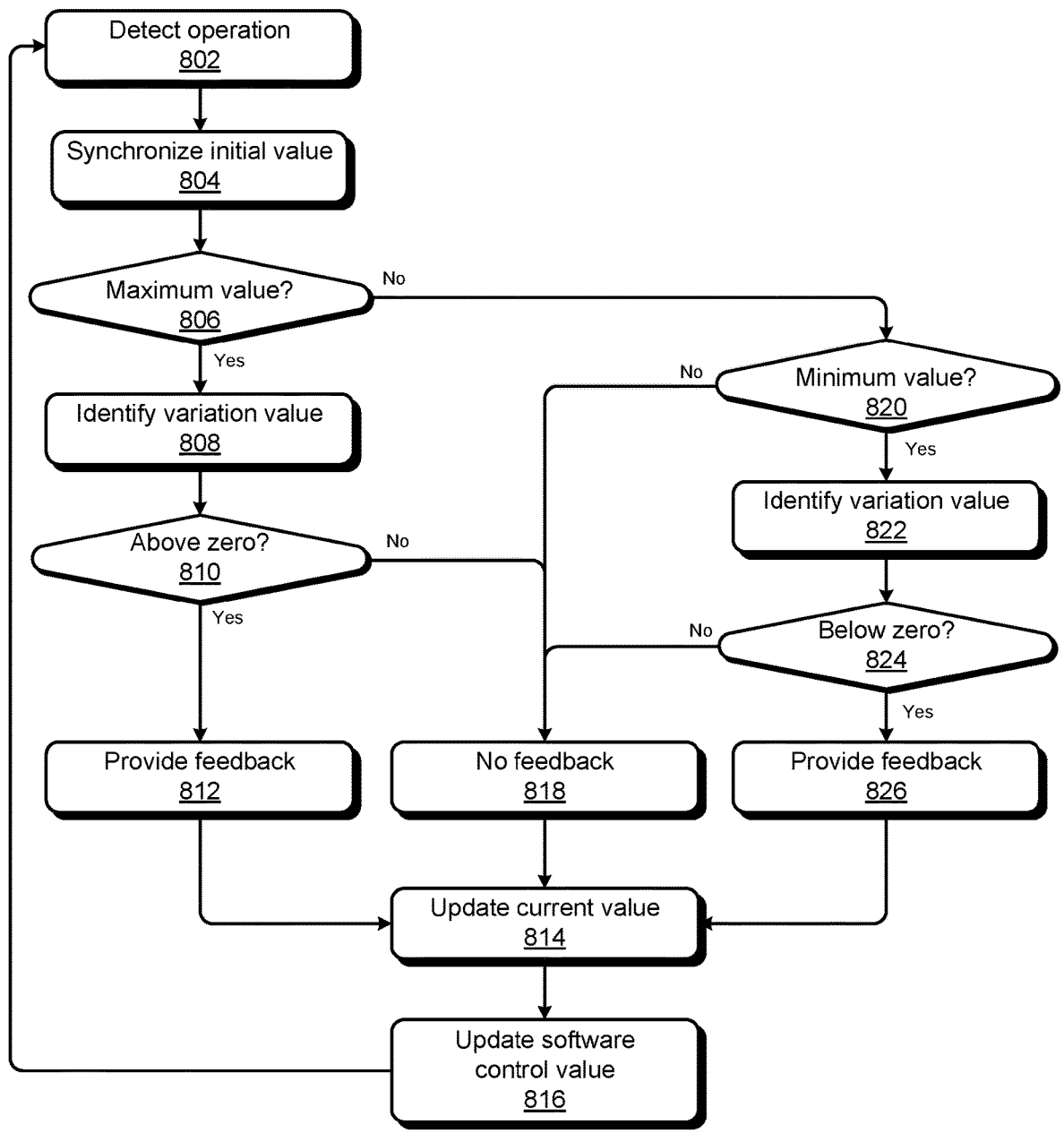
FIG. 8 illustrates an exemplary process of dynamically providing perceptible feedback for a rotary control component according to an embodiment.

FIG. 8 illustrates an exemplary process 800 of dynamically providing perceptible feedback for a rotary control component according to an embodiment. The process 800 may correspond to, e.g., the feedback enforcing strategy 610 in FIG. 6. The process 800 may determine whether a feedback condition is met by using an initial value and a variation value of the rotary control component directly.

At 802, a rotation operation on the rotary control component may be detected. For example, a controller in an electronic device may keep monitoring any rotation operation by users on the rotary control component, and a detected rotation operation would trigger the following steps in the process 800.

At 804, an initial value of the rotary control component may be synchronized with a software control value of the electronic device. The software control value may be obtained from a software control module and further assigned to the initial value.

At 806, it may be determined whether the initial value is equal to the maximum value settable by the rotary control component.

If it is determined at 806 that the initial value is equal to the maximum value, a variation value corresponding to the rotation operation may be identified at 808.

At 810, it may be determined whether the variation value is above zero. That is, it is determined whether the rotation operation is to further increase the initial value.

If it is determined at 810 that the variation value is above zero, perceptible feedback may be provided at 812. For example, a feedback component may provide the perceptible feedback in response to an instruction from a controller in the electronic device.

At 814, a current value of the rotary control component may be updated based on the initial value and the variation value. In this case, since the initial value is already the maximum value, the current value may be kept as the maximum value.

At 816, the software control value may be updated with the current value. For example, the software control value may be set as equal to the current value. Then the process 800 may return to 802 to detect any further rotation operation.

If it is determined at 810 that the variation value is below zero, which indicates that the rotation operation causes the initial value to decrease from the maximum value to a lower value, it may be determined at 818 that no feedback would be provided. Then the current value may be updated based on the initial value and the variation value at 814, e.g., by adding up the initial value and the variation value, and the software control value may be further updated at 816.

If it is determined at 806 that the initial value is not equal to the maximum value, then the process 800 will proceed to 820.

At 820, it may be determined whether the initial value is equal to the minimum value settable by the rotary control component.

If it is determined at 820 that the initial value is equal to the minimum value, a variation value corresponding to the rotation operation may be identified at 822.

At 824, it may be determined whether the variation value is below zero. That is, it is determined whether the rotation operation is to further decrease the initial value.

If it is determined at 824 that the variation value is below zero, perceptible feedback may be provided at 826. Then the current value may be updated based on the initial value and the variation value at 814. In this case, since the initial value is already the minimum value, the current value may be kept as the minimum value. The software control value may be further updated at 816.

If it is determined at 824 that the variation value is above zero, which indicates that the rotation operation causes the initial value to increase from the minimum value to a higher value, it may be determined at 818 that no feedback would be provided. Then the current value may be updated based on the initial value and the variation value at 814, e.g., by adding up the initial value and the variation value, and the software control value may be further updated at 816.

If it is determined at 820 that the initial value is not equal to the minimum value, it may be determined at 818 that no feedback would be provided. Then the current value may be updated based on the initial value and the variation value at 814, e.g., by adding up the initial value and the variation value, and the software control value may be further updated at 816.

It should be appreciated that all the steps and the order of these steps in the process 800 are exemplary, and various changes may be made to the process 800 according to actual application scenarios and requirements. For example, instead of performing the judgment of whether the initial value is the maximum value prior to the judgment of whether the initial value is the minimum value in the process 800, the order of these two judgment steps may also be exchanged. For example, instead of providing no feedback at 818 in the process 800, a feedback in a level different from levels of the feedbacks provided at 812 and 826 may be provided, and accordingly the modified process may correspond to, e.g., the feedback enforcing strategy 620 in FIG. 6.

Figure 9:
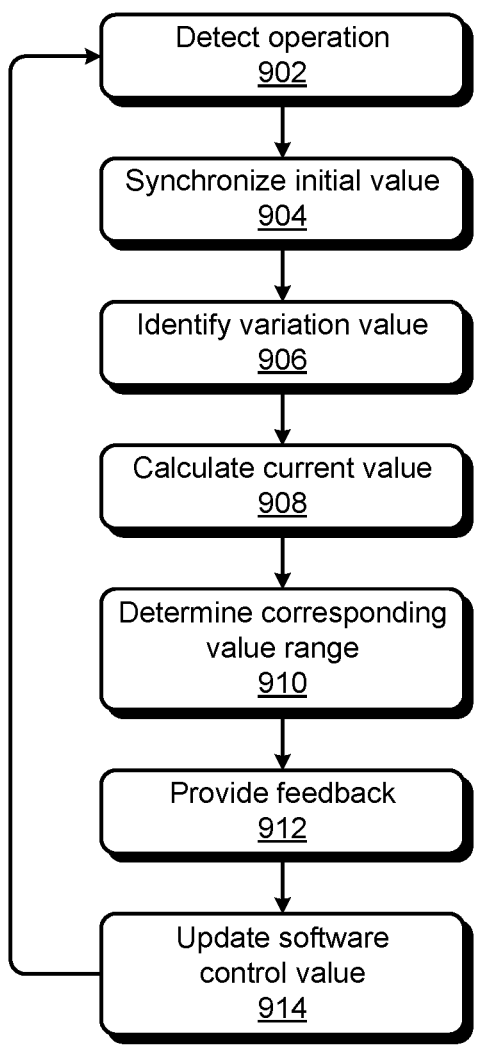
FIG. 9 illustrates an exemplary process of dynamically providing perceptible feedback for a rotary control component according to an embodiment.

FIG. 9 illustrates an exemplary process 900 of dynamically providing perceptible feedback for a rotary control component according to an embodiment. The process 900 may correspond to, e.g., the feedback enforcing strategies 630 in FIG. 6, and the feedback enforcing strategies 710 and 720 in FIG. 7. The process 900 may determine whether a feedback condition is met based on a current value calculated from an initial value and a variation value of the rotary control component.

At 902, a rotation operation on the rotary control component may be detected.

At 904, an initial value of the rotary control component may be synchronized with a software control value of the electronic device.

At 906, a variation value corresponding to the rotation operation may be identified.

At 908, a current value of the rotary control component may be calculated based on the initial value and the variation value. For example, the initial value and the variation value may be added up to obtain the current value. However, if the initial value is the maximum value and the variation value is above zero, the current value will be kept as the maximum value, and if the initial value is the minimum value and the variation value is below zero, the current value will be kept as the minimum value.

At 910, a predetermined value range into which the current value falls may be determined. For example, it may be desired to utilize perceptible feedback to enable users to recognize which value range the rotary control component is currently rotated to, and thus one or more interested value ranges may be predetermined for the electronic device. Accordingly, the determination at 910 may intend to find or select a predetermined value range corresponding to the current value from the one or more predetermined value ranges.

At 912, perceptible feedback in a level corresponding to the predetermined value range determined at 910 may be provided. For example, different feedback levels may be defined for different value ranges. Thus, the users may recognize which value range the rotary control component is currently rotated to through the level of the provided perceptible feedback. It should be appreciated that some of the predetermined value ranges may also be defined to the same feedback level.

At 914, the software control value may be updated with the current value. For example, the software control value may be set as equal to the current value. Then the process 900 may return to 902 to detect any further rotation operation.

It should be appreciated that all the steps and the order of these steps in the process 900 are exemplary, and various changes may be made to the process 900 according to actual application scenarios and requirements.

Figure 10:
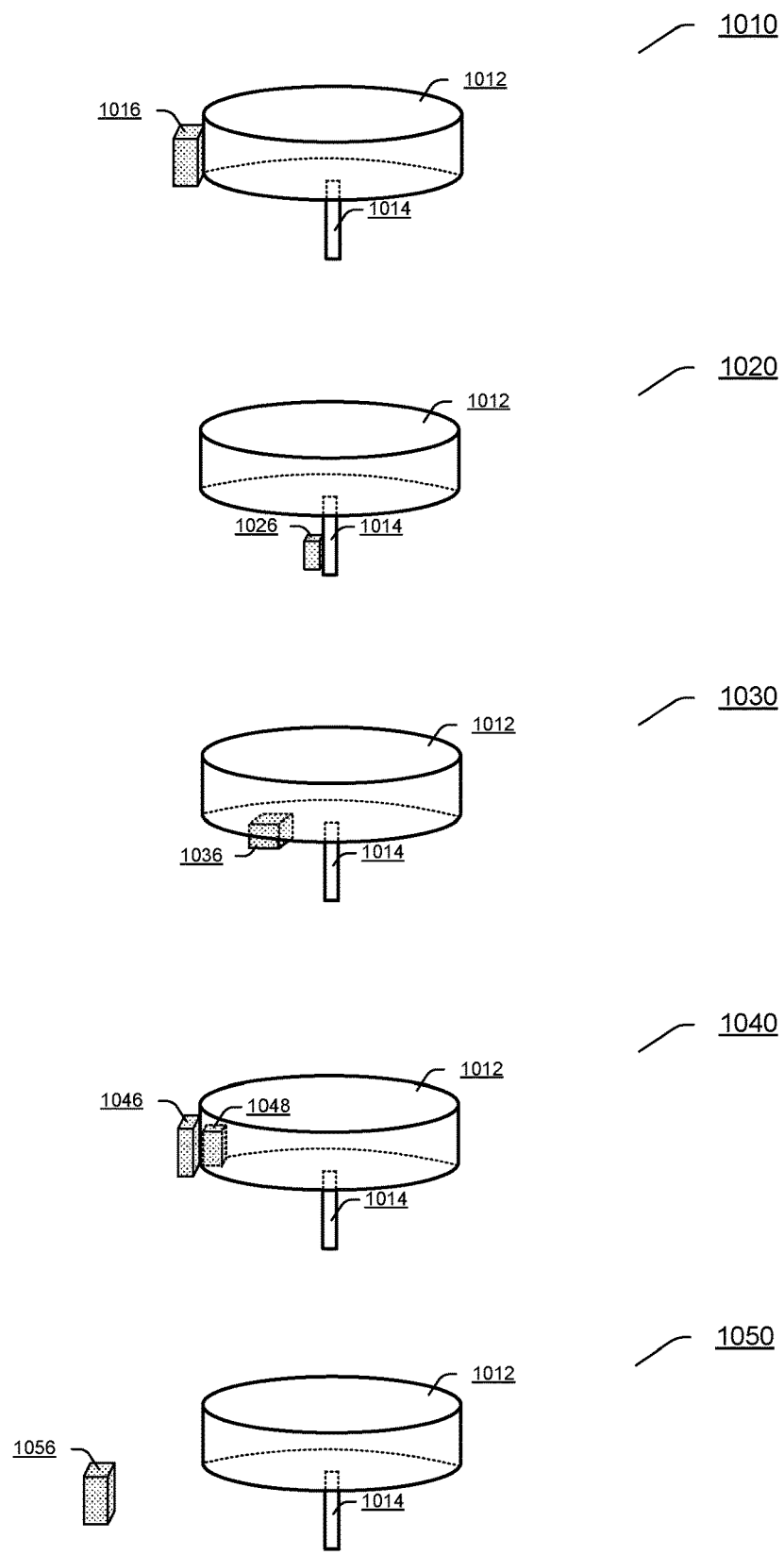
FIG. 10 illustrates exemplary operating approaches of feedback components according to some embodiments.

FIG. 10 illustrates exemplary operating approaches of feedback components according to some embodiments. Feedback components may provide perceptible feedback in various operating approaches. In some cases, when providing perceptible feedback, a feedback component may be operably coupled to at least one part of a rotary control component, so as to provide the perceptible feedback via the rotary control component. For example, the feedback component may be operably coupled to shaft, ring edge, lower surface, etc. of the rotary control component. Herein, "operably coupling" between the feedback component and the rotary control component may refer to functional interaction, interoperation or force applying in a contacted or non-contact way. While if no feedback is to provide, the coupling between the feedback component and the rotary control component may be released. In other cases, no matter whether the feedback component is providing perceptible feedback, the feedback component may be not operably coupled to the rotary control component. That is, the perceptible feedback may be provided independently from the rotary control component.

In FIG. 10, several exemplary operating approaches 1010, 1020, 1030, 1040 and 1050 of feedback components are discussed with respect to a rotary control component 1012 in an electronic device, wherein the rotary control component 1012 comprises a shaft 1014 around which the rotary control component 1012 is rotated.

In the operating approach 1010, a feedback component 1016 may be operably coupled to the ring edge of the rotary control component 1012. For example, in response to control instructions from a controller in the electronic device, the feedback component 1016 may be operably coupled to the ring edge so as to provide perceptible feedback, or release the coupling so as not to provide any feedback.

In the operating approach 1020, a feedback component 1026 may be operably coupled to the shaft 1014 of the rotary control component 1012. For example, in response to control instructions from the controller, the feedback component 1026 may be operably coupled to the shaft 1014 so as to provide perceptible feedback, or release the coupling so as not to provide any feedback.

In the operating approach 1030, a feedback component 1036 may be operably coupled to the lower surface of the rotary control component 1012. For example, in response to control instructions from the controller, the feedback component 1036 may be operably coupled to the lower surface so as to provide perceptible feedback, or release the coupling so as not to provide any feedback.

In the operating approach 1040, a feedback component may comprise two feedback units 1046 and 1048 that cooperate with each other. The feedback unit 1046 may be outside of the rotary control component 1012, while the feedback unit 1048 may be included inside the rotary control component 1012. The feedback unit 1046 may be operably coupled to the feedback unit 1048. For example, in response to control instructions from the controller, the feedback unit 1046 may be operably coupled to the feedback unit 1048 so as to provide perceptible feedback, or release the coupling so as not to provide any feedback. Taking a moving detent changer as an example of the feedback component, the feedback unit 1046 may be a wedgy unit, and the feedback unit 1048 may be one or more notches or ratchets formed in the rotary control component 1012. When the wedgy unit is moved to contact the notches or ratchets, damping force, as perceptible feedback, may be generated on the rotary control component 1012, while if the wedgy unit is moved away to a position not contacted the notches or ratchets, no perceptible feedback would be provided.

In the operating approach 1050, a feedback component 1056 may be not operably coupled to the rotary control component 1012 no matter whether perceptible feedback is to provide. The feedback component 1056 may be based on, e.g., sound feedback mechanism, visual feedback mechanism, etc., and thus the feedback component 1056 may provide perceptible feedback, e.g., sound, flashing light, etc., based on control instructions by the controller but independently from the rotary control component. However, although the feedback component 1056 needs not to be operably coupled to the rotary control component 1012, the feedback component 1056 may be still installed in the rotary control component 1012 or contact the rotary control component 1012.

It should be appreciated that the embodiments of the present disclosure are not limited to the operating approaches shown in FIG. 10, but should cover any other operating approaches. Although the rotary control component in FIG. 10 is shown as a dial, the operating approaches of feedback components discussed above may also be similarly applied to a rotary control component in a form of wheel. Moreover, for a given rotary control component, more than one feedback component may be applied, and more than one feedback mechanism may be adopted.

Figure 11:
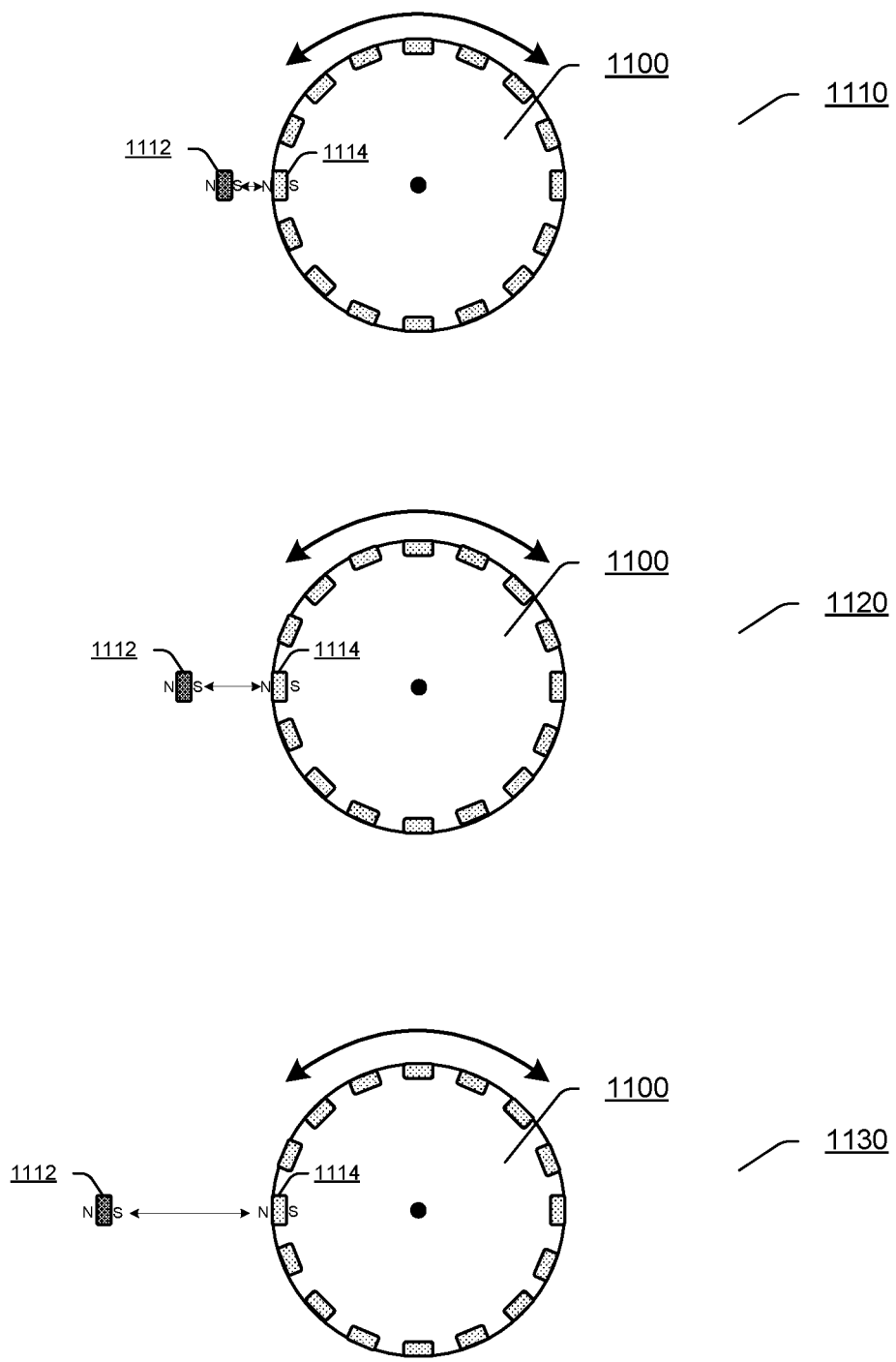
FIG. 11 illustrates exemplary magnet-based detent feedback mechanism according to an embodiment.

FIG. 11 illustrates exemplary magnet-based detent feedback mechanism according to an embodiment. The detent feedback mechanism in FIG. 11 is implemented through a moving detent changer. The moving detent changer comprises: a moving magnet unit 1112, which is placed outside a rotatory control component 1100 and is movable in a radial direction of the rotatory control component 1100; and a total of 16 fixed magnet units 1114 installed in the rotatory control component 1100. The fixed magnet units 1114 are uniformly placed around the ring edge of the rotatory control component 1100, e.g., spaced from each other by 22.5 degrees, and all the fixed magnet units 1114 are in the same polarity direction, e.g., the outside face is the "N" polarity. The moving magnet unit 1112 is in a polarity direction opposite to that of the fixed magnet units 1114, e.g., the face of the moving magnet unit 1112 that is adjacent to the fixed magnet units 1114 is the "S" polarity.

In state 1110, the moving magnet unit 1112 is very close to the rotatory control component 1100. When the rotatory control component 1100 is rotated, the moving magnet unit 1112 is attracted with the fixed magnet units 1114 under a magnetic field, and thus strong detent force or damping force may be felt. In the case of spacing the fixed magnet units 1114 from each other by 22.5 degrees, the detent force may also be provided for every 22.5 degrees.

As shown in state 1120, when the moving magnet unit 1112 is moved away from the rotatory control component 1100, e.g., the distance between the moving magnet unit 1112 and the rotatory control component 1100 increases, the detent force will decrease accordingly.

In state 1130, the moving magnet unit 1112 is far away from the rotatory control component 1100, such that no detent force will be provided.

Through the transitions among the states shown in FIG. 11, the detent force may be controlled from zero to the maximum continuously, thus providing analog levels of feedback.

It should be appreciated that the magnet-based detent feedback mechanism shown in FIG. 11 may also be altered in various approaches. For example, instead of a total of 16 fixed magnet units, a different number of fixed magnet units may be installed in the rotary control component 1100.

Figure 12:
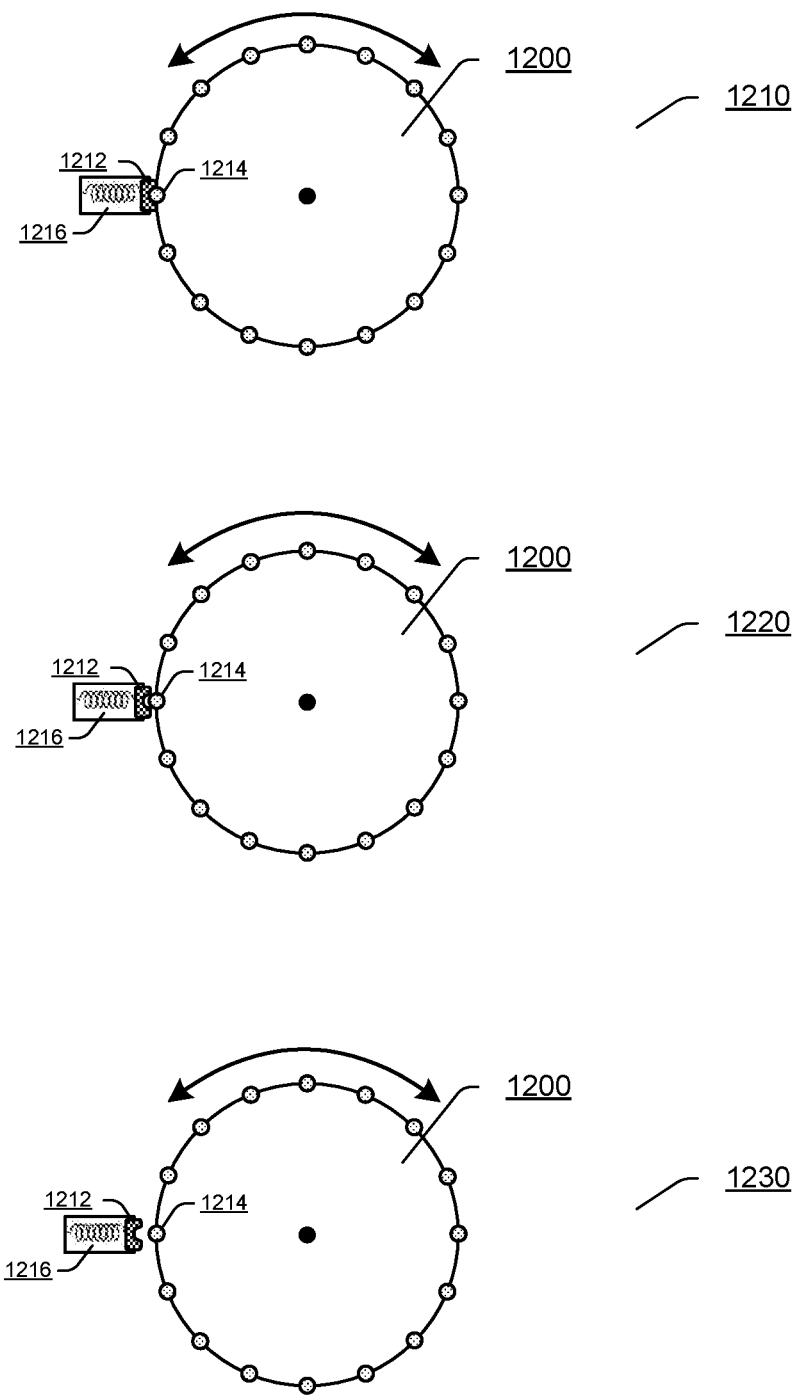
FIG. 12 illustrates exemplary bump-based detent feedback mechanism according to an embodiment.

FIG. 12 illustrates exemplary bump-based detent feedback mechanism according to an embodiment. The detent feedback mechanism in FIG. 12 is implemented through a moving detent changer. The moving detent changer comprises: a moving bump unit 1212, which is placed outside a rotary control component 1200 and is movable in a radial direction of the rotary control component 1200; a total of 16 fixed bump units 1214 installed in the rotary control component 1200; and a push spring 1216, connected to the moving bump unit 1212 for providing spring force for the moving bump unit 1212. The fixed bump units 1214 are uniformly placed around the ring edge of the rotary control component 1200, e.g., spaced from each other by 22.5 degrees, and all the fixed bump units 1214 are male units. The moving bump unit 1212 is a female unit.

In state 1210, the moving bump unit 1212 is very close to the rotary control component 1200, and thus deeply contacts to the fixed bump units 1214. When the rotary control component 1200 is rotated, the moving bump unit 1212 and the fixed bump units 1214 are engaged with each other, and thus strong detent force or damping force may be felt. In the case of spacing the fixed bump units 1214 from each other by 22.5 degrees, the detent force may also be provided for every 22.5 degrees.

As shown in state 1220, when the moving magnet unit 1212 is moved away from the rotary control component 1200, e.g., the distance between the moving magnet unit 1212 and the rotary control component 1200 increases, the detent force will decrease accordingly.

In state 1230, the moving bump unit 1212 is far away from the rotary control component 1200, such that the moving bump unit 1212 cannot contact to the fixed bump units 1214, and accordingly no detent force will be provided.

Through the transitions among the states shown in FIG. 12, the detent force may be controlled from zero to the maximum continuously, thus providing analog levels of feedback. Moreover, this bump-based detent feedback mechanism may provide shaper or clearer detent force than the magnet-based detent feedback mechanism in FIG. 11.

It should be appreciated that the bump-based detent feedback mechanism shown in FIG. 12 may also be altered in various approaches. For example, instead of a total of 16 fixed bump units, a different number of fixed bump units may be installed in the rotary control component 1200. For example, bump pairs may also be reversed, e.g., the moving bump unit 1212 may be male while the fixed bump units 1214 may be female.

Figure 13:
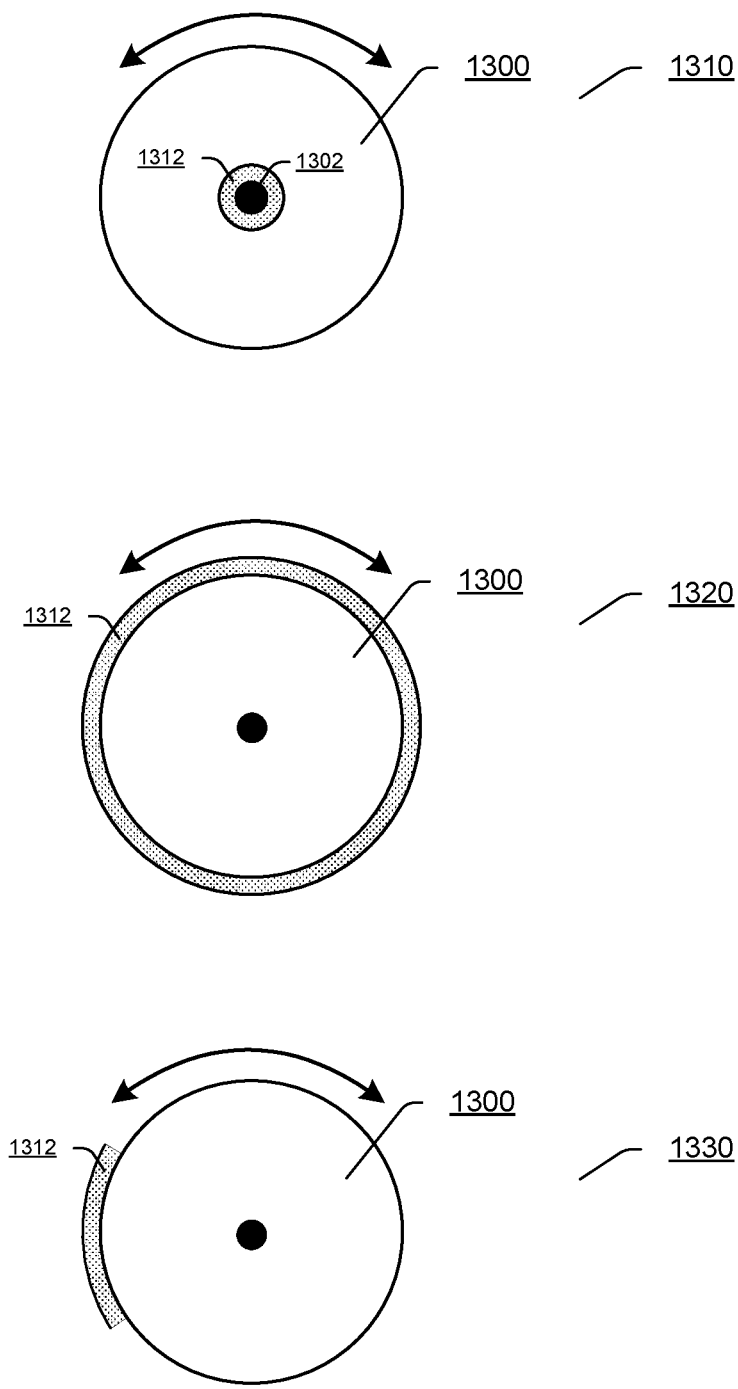
FIG. 13 illustrates exemplary structures of brake feedback mechanism according to some embodiments.

FIG. 13 illustrates exemplary structures of brake feedback mechanism according to some embodiments. In FIG. 13, a brake unit 1312 is used for applying brake force to a rotary control component 1300.

The brake unit 1312 may be installed in various structures. In example 1310, the brake unit 1312 is placed around a shaft 1302 of the rotary control component 1300. In example 1320, the brake unit 1312 is of a circle shape, and is placed between the ring edge of the rotary control component 1300 and a surrounding structure of the electronic device. In example 1330, the brake unit 1312 is of an arc shape, and is placed between the ring edge of the rotary control component 1300 and a part of a surrounding structure of the electronic device.

The brake unit 1312 may be MR brake, ER brake, polymer brake, etc. If the brake unit 1312 is a MR brake, brake force may be controlled by applying a magnetic field. The magnetic field may be generated, e.g., by an electromagnet coil. If the brake unit 1312 is an ER brake or a polymer brake, brake force may be controlled by applying an electric field. The electric field may be generated, e.g., by high-voltage electrodes. When no magnetic field or electric field is applied, no brake force will be provided.

Through the structures shown in FIG. 13, the brake force may be controlled from zero to the maximum continuously, thus providing analog levels of feedback.

Figure 14:
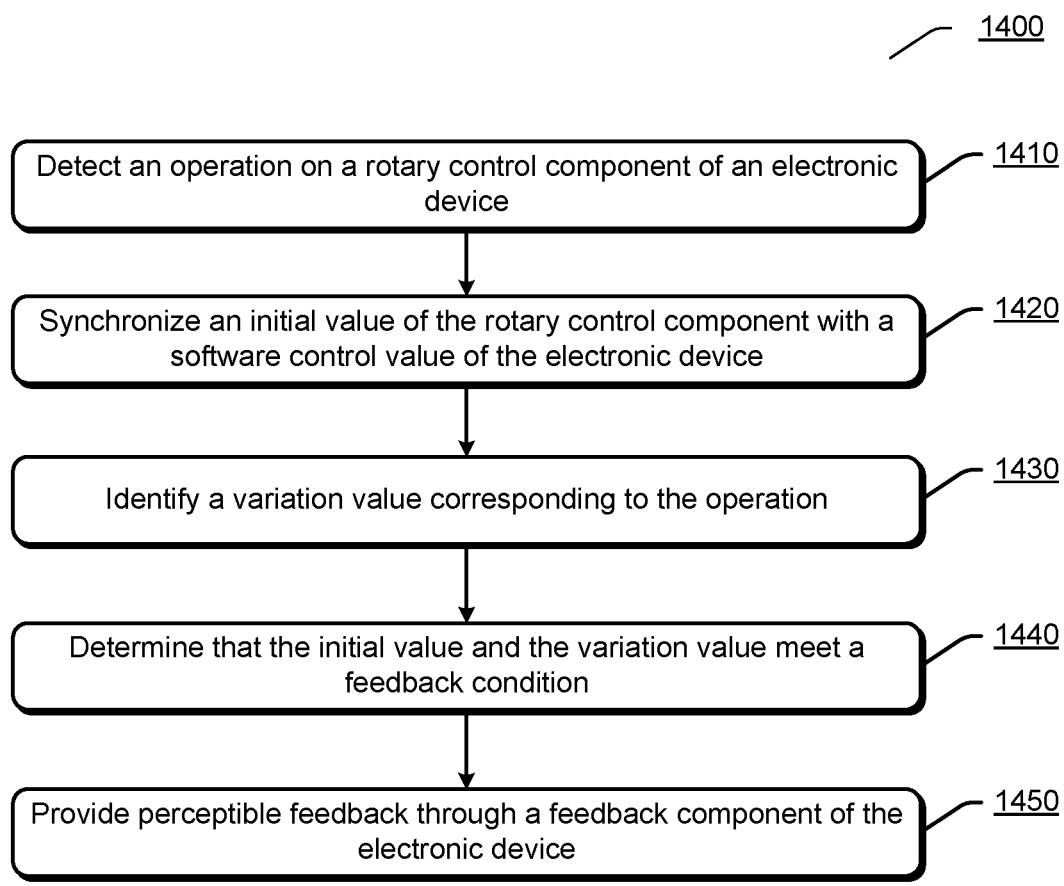
FIG. 14 illustrates a flowchart of an exemplary method for dynamically providing perceptible feedback for a rotary control component of an electronic device according to an embodiment.

FIG. 14 illustrates a flowchart of an exemplary method 1400 for dynamically providing perceptible feedback for a rotary control component of an electronic device according to an embodiment.

At 1410, an operation on the rotary control component may be detected.

At 1420, an initial value of the rotary control component may be synchronized with a software control value of the electronic device.

At 1430, a variation value corresponding to the operation may be identified.

At 1440, it may be determined that the initial value and the variation value meet a feedback condition.

At 1450, perceptible feedback may be provided through a feedback component of the electronic device.

In an implementation, the feedback condition may comprise at least one of: the initial value is the maximum value settable by the rotary control component, and the variation value is above zero; and the initial value is the minimum value settable by the rotary control component, and the variation value is below zero.

The providing the perceptible feedback may comprise: providing the perceptible feedback in a first level.

The feedback condition may further comprise: a current value calculated based on the initial value and the variation value is between the maximum value and the minimum value. The providing the perceptible feedback may comprise: providing the perceptible feedback in a second level lower than the first level, if the feedback condition that the current value is between the maximum value and the minimum value is met. The second level may be proportional to the current value.

In an implementation, the determining may comprise: calculating a current value of the rotary control component based on the initial value and the variation value; and determining that the current value meets the feedback condition.

The feedback condition may comprise: the current value is within a predetermined value range of one or more predetermined value ranges settable by the rotary control component.

The providing the perceptible feedback may comprise: providing the perceptible feedback in a level corresponding to the predetermined value range.

In an implementation, the method 1400 may further comprise: calculating a current value of the rotary control component based on the initial value and the variation value; and updating the software control value with the current value of the rotary control component.

It should be appreciated that the method 1400 may further comprise any steps/processes for dynamically providing perceptible feedback for a rotary control component of an electronic device according to the embodiments of the present disclosure as mentioned above.

Figure 15:
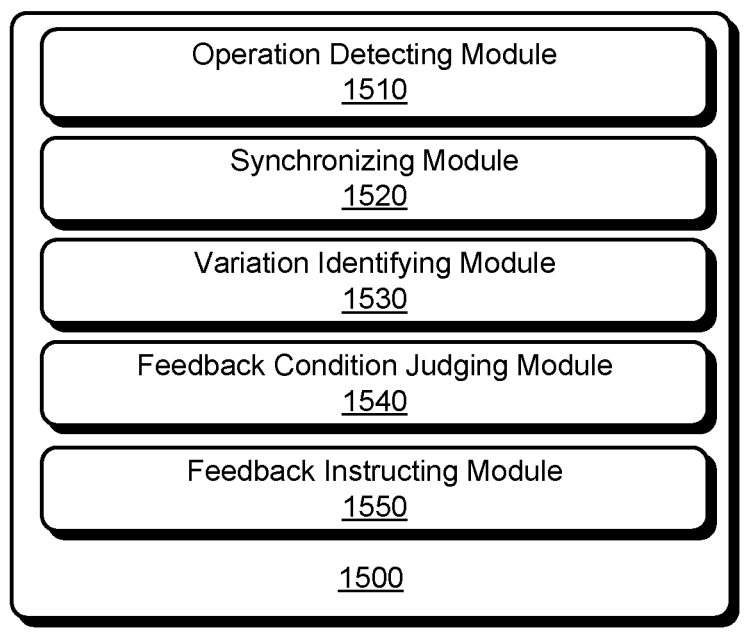
FIG. 15 illustrates an exemplary apparatus for dynamically providing perceptible feedback for a rotary control component of an electronic device according to an embodiment.

FIG. 15 illustrates an exemplary apparatus 1500 for dynamically providing perceptible feedback for a rotary control component of an electronic device according to an embodiment.

The apparatus 1500 may comprise: an operation detecting module 1510, for detecting an operation on the rotary control component; a synchronizing module 1520, for synchronizing an initial value of the rotary control component with a software control value of the electronic device; a variation identifying module 1530, for identifying a variation value corresponding to the operation; a feedback condition judging module 1540, for determining that the initial value and the variation value meet a feedback condition; and a feedback instructing module 1550, for instructing a feedback component of the electronic device to provide perceptible feedback.

In an implementation, the feedback condition may comprise at least one of: the initial value is the maximum value settable by the rotary control component, and the variation value is above zero; the initial value is the minimum value settable by the rotary control component, and the variation value is below zero; and a current value calculated based on the initial value and the variation value is between the maximum value and the minimum value.

In an implementation, the feedback condition judging module 1540 may be for: calculating a current value of the rotary control component based on the initial value and the variation value; and determining that the current value meets the feedback condition. The feedback condition may comprise: the current value is within a predetermined value range of one or more predetermined value ranges settable by the rotary control component.

Moreover, the apparatus 1500 may also comprise any other modules configured for dynamically providing perceptible feedback for a rotary control component of an electronic device according to the embodiments of the present disclosure as mentioned above.

Figure 16:
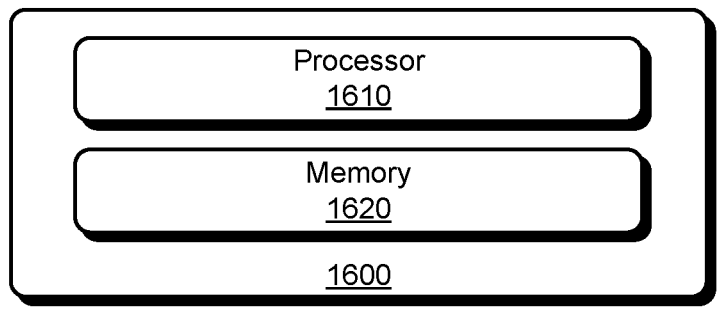
FIG. 16 illustrates an exemplary apparatus for dynamically providing perceptible feedback for a rotary control component of an electronic device according to an embodiment.

FIG. 16 illustrates an exemplary apparatus 1600 for dynamically providing perceptible feedback for a rotary control component of an electronic device according to an embodiment.

The apparatus 1600 may comprise at least one processor 1610 and a memory 1620 storing computer-executable instructions. When executing the computer-executable instructions, the at least one processor 1610 may perform any operations of the methods for dynamically providing perceptible feedback for a rotary control component of an electronic device according to the embodiments of the present disclosure as mentioned above.

The embodiments of the present disclosure provides an electronic device, comprising: a rotary control component, being rotatable to cause a change of operating state of the electronic device; a feedback component, for providing perceptible feedback; and a controller, connected to the rotary control component and the feedback component. The controller may be configured for: detecting an operation on the rotary control component; synchronizing an initial value of the rotary control component with a software control value of the electronic device; identifying a variation value corresponding to the operation; determining that the initial value and the variation value meet a feedback condition; and instructing the feedback component to provide perceptible feedback.

In an implementation, the rotary control component may be a dial or a wheel.

In an implementation, the feedback component may comprise at least one of: haptic feedback mechanism; detent feedback mechanism; brake feedback mechanism; sound feedback mechanism; and visual feedback mechanism.

In an implementation, the haptic feedback mechanism may be implemented through at least one of a LRA, a piezo actuator, and an ERM actuator.

The detent feedback mechanism may be implemented through a moving detent changer. The brake feedback mechanism may be implemented through at least one of MR fluid brake, ER fluid brake, and polymer brake. The sound feedback mechanism may be implemented through a sound player. The visual feedback mechanism may be implemented through a visual indication displaying unit.

In an implementation, when providing the perceptible feedback, the feedback component may be operably coupled to at least one part of the rotary control component, or is not operably coupled to the rotary control component.

In an implementation, the software control value is settable through a software control module associated with the electronic device.

Moreover, the controller in the electronic device may also be configured for performing any steps/processes of the methods for dynamically providing perceptible feedback for a rotary control component of an electronic device according to the embodiments of the present disclosure as mentioned above.

The embodiments of the present disclosure may be embodied in a non-transitory computer-readable medium. The non-transitory computer-readable medium may comprise instructions that, when executed, cause one or more processors to perform any operations of the methods for dynamically providing perceptible feedback for a rotary control component of an electronic device according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors, e.g., cache or register.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skilled in the art are intended to be encompassed by the claims.

What is claimed is:

1. An electronic device, comprising:
  a rotary control component, being rotatable to cause a change of operating state of the electronic device;
  a feedback component, for providing perceptible feedback; and
  a controller, connected to the rotary control component and the feedback component, and configured for;
  detecting an operation on the rotary control component,
  synchronizing an initial value of the rotary control component with a software control value of the electronic device, identifying a variation value corresponding to the operation,
  determining that the initial value and the variation value meet a feedback condition, and instructing the feedback component to provide perceptible feedback at a first level when the
  determining that the initial value and the variation value meet a feedback condition, and instructing the feedback component to provide perceptible feedback at a first level when the feedback condition is that:
    (i) the initial value is the maximum value settable by the rotary control. component and the variation value is above zero; or
    (ii) the initial value is the minimum value settable by the rotary control component and the variation value is below zero;
  and a second level that is lower than the first level when the feedback condition is that the initial value and the variation value is between the maximum value and the minimum value; and
  wherein the second level of feedback is unique for each value of the initial value and the variation value when the initial value and the variation value are between the minimum and maximum value settable by the rotary control.

2. The method of claim 1, wherein the feedback condition further comprises:
  a current value calculated based on the initial value and the variation value is between the maximum value and the minimum value.

3. The method of claim 2, wherein the second level is proportional to the current value.

4. The method of claim 1, wherein the determining comprises:
  calculating a current value of the rotary control component based on the initial value and the variation value; and
  determining that the current value meets the feedback condition.

5. The method of claim 1, further comprising:
  calculating a current value of the rotary control component based on the initial value and the variation value; and
  updating the software control value with the current value of the rotary control component.

6. An electronic device, comprising:
  a rotary control component, being rotatable to cause a change of operating state of the electronic device;
  a feedback component, for providing perceptible feedback, and
  a controller, connected to the rotary control component and the feedback component, and configured for:
  detecting an operation on the rotary control component,
  synchronizing an initial value of the rotary control component with a software control value of the electronic device,
  identifying a variation value corresponding to the operation,
  determining that the initial value and the variation value meet a feedback condition, and
  instructing the feedback component to provide perceptible feedback at a first level when the feedback condition is that:
    (i) the initial value is the maximum value settable by the rotary control component and the variation value is above zero; or
    (ii) (ii) the initial value is the minimum value settable by the rotary control component and the variation value is below zero;
  and a second level that is lower than the first level when the feedback condition is that the initial value and the variation value is between the maximum value and the minimum value; and
  wherein the second level of feedback is unique for each value of the initial value and the variation value when the initial value and the variation value are between the minimum and maximum value settable by the rotary control.

7. The electronic device of claim 6, wherein the rotary control component is a dial or a wheel.

8. The electronic device of claim 6, wherein the feedback component comprises at least one of:
  haptic feedback mechanism;
  detent feedback mechanism;
  brake feedback mechanism;
  sound feedback mechanism, and
  visual feedback mechanism.

9. The electronic device of claim 8, wherein
  the haptic feedback mechanism is implemented through at least one of a linear resonant actuator (LRA), a piezo actuator, and an eccentric rotating mass (ERM) actuator;
  the detent feedback mechanism is implemented through a moving detent changer;

the brake feedback mechanism is implemented through at least one of magneto rheological (MR) fluid brake, electro rheological (ER) fluid brake, and polymer brake;
the sound feedback mechanism is implemented through a sound player; and
the visual feedback mechanism is implemented through a visual indication displaying unit.

10. The electronic device of claim 6, wherein when providing the perceptible feedback, the feedback component is operably coupled to at least one part of the rotary control component, or is not operably coupled to the rotary control component.

11. The electronic device of claim 6, wherein the software control value is settable through a software control module associated with the electronic device.

12. An apparatus for dynamically providing perceptible feedback for a rotary control component of an electronic device, comprising:
an operation detecting module, for detecting an operation on the rotary control component;
a synchronizing module, for synchronizing an initial value of the rotary control component with a software control value of the electronic device;
a variation identifying module, for identifying a variation value corresponding to the operation;
a feedback condition judging module, for determining that the initial value and the variation value meet a feedback condition; and
a feedback instructing module, for instructing a feedback component of the electronic device to provide perceptible feedback at a first level when the feedback condition is that:
(i) the initial value is the maximum value settable by the rotary control. component and the variation value is above zero; or
(ii) the initial value is the minimum value settable by the rotary control component and the variation value is below zero;
and a second level that is lower than the first level when the feedback condition is that the initial value and the variation value is between the maximum value and the minimum value; and
wherein the second level of feedback is unique for each value of the initial value and the variation value when the initial value and the variation value are between the minimum and maximum value settable by the rotary control.

13. The apparatus of claim 12, wherein
the feedback condition judging module is for:
calculating a current value of the rotary control component based on the initial value and the variation value; and determining that the current value meets the feedback condition; and
the feedback condition comprises: the current value is within a predetermined value range of one or more predetermined value ranges settable by the rotary control component.

14. An apparatus for dynamically providing perceptible feedback for a rotary control component of an electronic device, comprising:
at least one processor, and
a memory storing computer-executable instructions that, when executed, cause the at least one processor to:
detect an operation on the rotary control component,
synchronize an initial value of the rotary control component with a software control value of the electronic device,
identify a variation value corresponding to the operation,
determine that the initial value and the variation value meet a feedback condition, and instruct a feedback component of the electronic device to provide perceptible feedback at a first level when the feedback condition is that:
(i) the initial value is the maximum value settable by the rotary control. component and the variation value is above zero; or
(ii) the initial value is the minimum value settable by the rotary control component and the variation value is below zero;
and a second level that is lower than the first level when the feedback condition is that the initial value and the variation value is between the maximum value and the minimum value; and
wherein the second level of feedback is unique for each value of the initial value and the variation value when the initial value and the variation value are between the minimum and maximum value settable by the rotary control.

* * * * *